US008525495B2

(12) United States Patent
Werle et al.

(10) Patent No.: US 8,525,495 B2
(45) Date of Patent: Sep. 3, 2013

(54) INPUT CURRENT GENERATOR FOR BUCK-BOOST CIRCUIT CONTROL

(75) Inventors: Paul Werle, Newbury, OH (US); Todd E Kooken, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 439 days.

(21) Appl. No.: 12/477,550

(22) Filed: Jun. 3, 2009

(65) Prior Publication Data
US 2010/0309697 A1 Dec. 9, 2010

(51) Int. Cl.
*G05F 1/24* (2006.01)

(52) U.S. Cl.
USPC .............................. 323/259; 323/266; 363/89

(58) Field of Classification Search
USPC ............... 363/21.09–21.11, 21.17, 21.18, 76, 363/78, 81, 86, 87, 125, 126, 129; 323/223, 323/224, 259, 266, 271, 282, 285, 288, 344, 323/351
See application file for complete search history.

(56) References Cited

U.S. PATENT DOCUMENTS

| | | | | |
|---|---|---|---|---|
| 4,974,141 | A | * | 11/1990 | Severinsky et al. ............. 363/81 |
| 5,402,060 | A | | 3/1995 | Erisman |
| 5,602,463 | A | * | 2/1997 | Bendall et al. ................ 323/266 |
| 5,757,634 | A | | 5/1998 | Ferens |
| 5,969,962 | A | * | 10/1999 | Gabor ............................ 363/89 |
| 6,992,469 | B1 | | 1/2006 | King |
| 2006/0274559 | A1 | | 12/2006 | Saeueng et al. |
| 2008/0164859 | A1 | | 7/2008 | Peng et al. |
| 2008/0278123 | A1 | * | 11/2008 | Mehas et al. .................. 323/266 |
| 2008/0284397 | A1 | * | 11/2008 | Chang ............................ 323/283 |
| 2009/0039852 | A1 | | 2/2009 | Fishelov et al. |
| 2010/0308782 | A1 | | 12/2010 | Werle et al. |

FOREIGN PATENT DOCUMENTS

| | | |
|---|---|---|
| EP | 0 735 656 | 10/1996 |
| WO | WO 89/11691 | 11/1985 |
| WO | WO 98/09368 | 3/1998 |
| WO | WO 2010/140051 | 12/2010 |

OTHER PUBLICATIONS

Y.M. Jiang and F.C. Lee "A New Control Scheme for Buck+Boost Power Factor Correction Circuit"; Proceedings of the Virginia Power Electronics Seminar; Sep. 19-21, 1993; pp. 189-193.
Ray Ridley, Siegfried Kern and Berthold Fuld, "Analysis and Design of a Wide Input Range Power Factor Correction Circuit for Three-Phase Applications"; IEEE 1993; pp. 299-305.
Kevin Covi, "A Combined Buck and Boost Converter for Single-Phase Power Factor Correction", 2005 IBM Power and Cooling Technology Symposium, Oct. 7, 2005.
Viswanathan K, et al. "Dual-mode control of cascade buck-boost PFC Converter", 2004, IEEE, 2004 35th Annual PESC, pp. 2178-2184.
Intl. Preliminary Report on Patentability for counterpart Intl. App. PCT/IB2010/001326 (WOIB2010/140051); 8 pgs.; Aug. 25, 2011.
Written Opinion for Intl. App. PCT/IB2010/001326 (WO2010/140051); 6 pgs.; (posted Dec. 3, 2011 at <http://www.wipo.int/pctdb/en/wo.jsp?WO=2010140051> accessed Jan. 24, 2011).
ISR for counterpart Intl. App. PCT/IB2010/001326 (WOIB2010/140051); 5 pgs.; Aug. 31, 2010.
U.S. Appl. No. 12/477,511; Notice of Allowance dated Aug. 17, 2012.
U.S. Appl. No. 12/477,511.

\* cited by examiner

*Primary Examiner* — Adolf Berhane
*Assistant Examiner* — Gustavo Rosario Benitez
(74) *Attorney, Agent, or Firm* — Perkins Coie LLP

(57) ABSTRACT

A control circuit for a buck-boost circuit includes an inductor current sensor and an input current generator. The input current generator accepts a signal from the inductor current sensor and outputs a synthesized and integrated signal representing the average input current to the buck-boost circuit. The input current generator averages the inductor current signal or a zero signal based on the state of the buck switch in the buck-boost circuit.

10 Claims, 5 Drawing Sheets

INPUT CURRENT GENERATOR FOR BUCK-BOOST CIRCUIT CONTROL

BACKGROUND OF THE INVENTION

This invention relates to control of pre-regulators in inverter-type power supplies and, more particularly, to a buck-boost controller in a pre-regulator of an inverter-type power supply.

In inverter-type power supplies, the input voltage is first rectified and then subjected to high frequency switching in an inverter section. The output of the inverter section is transformed to a desired voltage via a transformer and rectifier. The high frequency switching in the inverter section allows for increased efficiency and the volume and weight of the transformer can be considerably reduced.

Typically, it is desirable from a design standpoint to maintain the voltage at the input to the inverter section at a relatively constant voltage. Therefore, in order to operate the power supply at a range of input voltages (e.g., 230 V to 575 V), a pre-regulator section may be added before the inverter section of the power supply. The pre-regulator is controlled such that the input voltage to the inverter section is maintained at a fixed voltage.

SUMMARY OF THE INVENTION

In an exemplary embodiment of the invention, a control circuit for a buck-boost circuit includes an inductor current sensor, an input current synthesizer, a current integrating circuit and a PWM controller that provides a PWM signal indicative of a difference between the output of the buck-boost circuit and a predetermined setpoint.

The input current synthesizer accepts a signal from the inductor current sensor and sends a synthesized current signal to the current averaging circuit. The current averaging circuit averages the synthesized current and sends a feedback signal representing an average synthesized current to the PWM controller. In a non-limiting embodiment, the current averaging circuit includes an integrating circuit to average the synthesized current.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
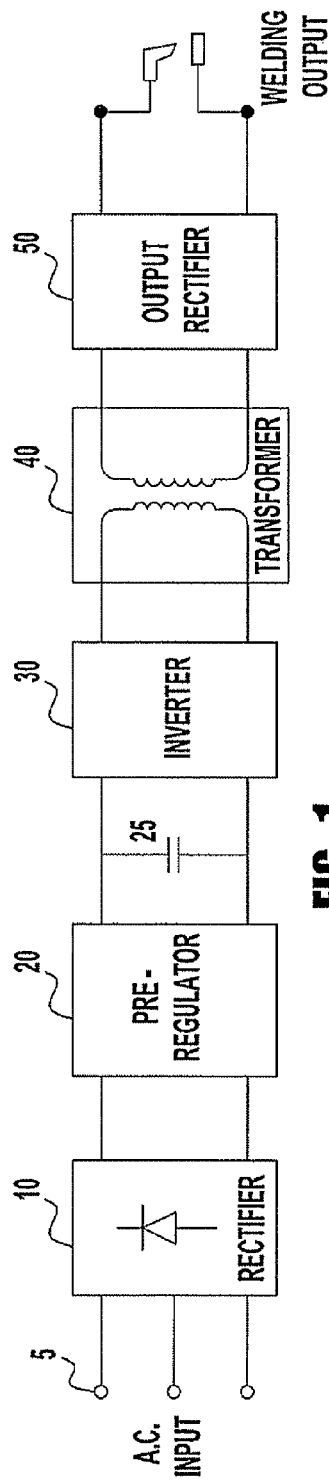
FIG. 1 illustrates a block diagram of a power supply consistent with an exemplary embodiment of the present invention.

FIG. 1 illustrates an exemplary embodiment of the present invention as applied to a three-phase power supply. However, exemplary embodiments of the present invention also include single-phase power supplies. Input terminals 5 receive a range of input voltages, e.g., from 115 volts rms to 575 volts rms. The input power signal is rectified by rectifier 10, which, in this illustrative embodiment, comprises a diode-bridge. The rectified output is then sent to pre-regulator 20.

Pre-regulator 20 is configured to provide a relatively constant pre-set voltage Vdc at the input of inverter 30 for the various input voltages. In this non-limiting exemplary embodiment, the output of the pre-regulator Vdc is set at 400 volts dc. A capacitor 25 may be used to store energy such that power flow to inverter 30 is un-interrupted as load varies. In the embodiment shown, the inverter 30 is a high-frequency switching circuit that converts the dc signal at its input to an ac signal.

The output of inverter 30 is converted by transformer 40 to an appropriate voltage for the desired application and rectified by output rectifier circuit 50. As an example, FIG. 1 shows an application where the power supply is used as a dc welder.

Figure 2:
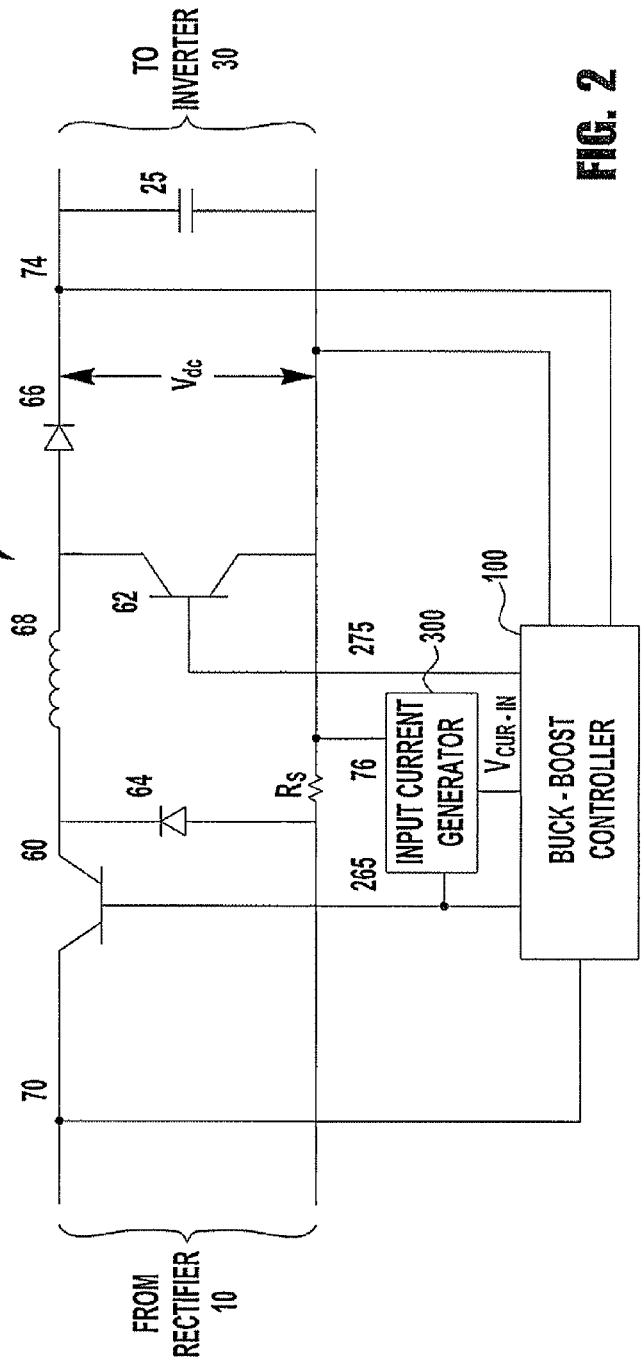
FIG. 2 illustrates an exemplary embodiment of the buck-boost circuit of the pre-regulator in the power supply shown in FIG. 1.

As shown in FIG. 2, in an exemplary embodiment of the present invention the pre-regulator 20 is configured as a buck-boost circuit. Pre-regulator 20 includes a buck switch 60, a boost switch 62, diodes 64 and 66 and an inductor 68. The buck switch 60 and the boost switch 62 may be a solid-state switch such as, for example, an IGBT or a MOSFET, and these switches are controlled by buck-boost controller 100 in order to maintain the output of pre-regulator 20, Vdc, at a desired setpoint. In a non-limiting embodiment, this setpoint for Vdc can be 400 volts dc. In other exemplary embodiments, the setpoint for Vdc can be set higher or lower based on operational or desired parameters.

Figure 4:
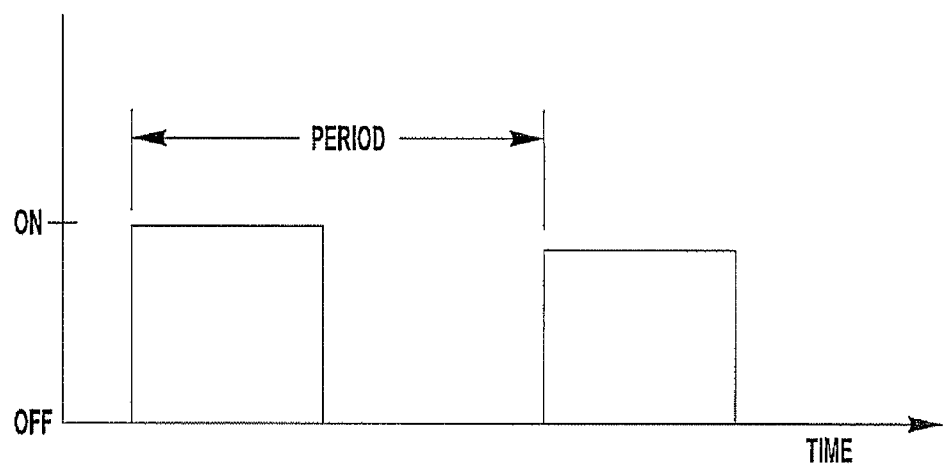
FIG. 4 illustrates an exemplary PWM signal.

Buck-boost controller 100 receives a signal representing the input current from input current generator 300 and outputs a buck PWM signal 265 and a boost PWM signal 275 that are sent to buck switch 60 and boost switch 62, respectively. These PWM signals, as the name implies, are pulse-width-modulated signals as illustrated in FIG. 4. A ratio of the ON time of these PWM signals to the period represents the duty-cycle of the PWM signal. A duty-cycle of 0% indicates that the PWM signal is OFF all the time, and duty-cycle of 100% indicates that the PWM signal is ON all the time.

Figure 3:
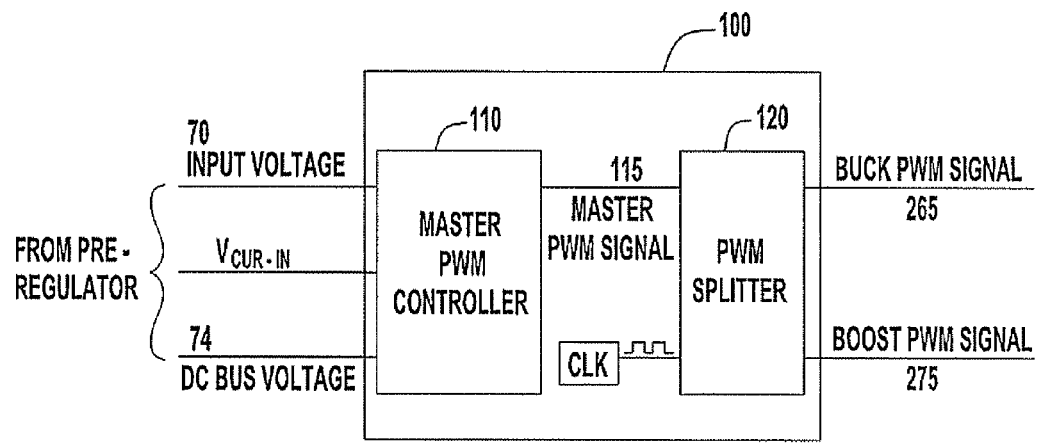
FIG. 3 is a block diagram of the exemplary buck-boost controller shown in FIG. 2.

As shown in FIG. 3, Buck-boost controller 100 comprises master PWM controller 110 and PWM splitter circuit 120. Master PWM controller 110 may be any standard, commercially available controller that provides a PWM signal. For example, in the illustrative exemplary embodiment, it is a boost-type power factor correction (PFC) controller. Master PWM controller 110 outputs a master PWM signal 115 that controls pre-regulator 20 such that its output voltage, Vdc, is at the desired setpoint. If controller 110 is also configured to perform PFC (as in the illustrative embodiment), then master PWM signal 115 will also control pre-regulator 20 such that the input current waveform matches the input voltage waveform.

Figure 5:
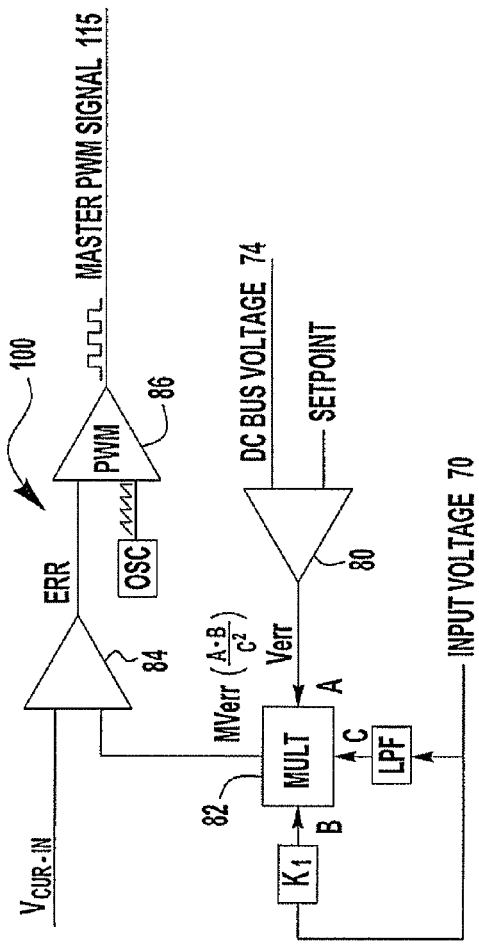
FIG. 5 is a circuit block diagram of the master PWM controller shown in FIG. 3.

To provide PFC control, master PWM controller 110 receives input voltage signal 70, dc bus voltage signal 74 (i.e., Vdc) and Vcur-in, which represents the average input current signal to the power supply. As shown in FIG. 5, DC bus voltage signal 74 is sent to comparator 80 whose other input is a reference voltage corresponding to the desired setpoint. The output of comparator 80 is an error signal, Verr, corresponding to the deviation from setpoint of Vdc. The error signal, Verr, is one input (input A) to multiplier 82. Multiplier 82 then modifies the error signal, Verr, using input voltage signal 70. In the illustrative embodiment, multiplier 82 receives a sinusoidal reference signal (input B) and a feedforward signal (input C) based on the input voltage signal 70, and outputs a modified error signal, MVerr, that is one input to current amplifier 84. In the illustrative embodiment, the modified error signal, MVerr, equals $A*B/C^2$. The other input to current amplifier 84 is the average input current signal, Vcur-in. The current amplifier 84 acts as a standard amplifier and outputs a signal, ERR, that is proportional to the difference between the two inputs. The output of current amplifier 84 is compared to a "saw-tooth" wave signal from an oscillator by PWM comparator 86. The output of PWM comparator 86 is master PWM signal 115, which is a square wave whose duty-cycle is proportional to the output of current amplifier 84. The operation of master PWM controller 110 is well known in the art and will not be discussed further.

Because the signal from master PWM controller 110 must be used to control both buck switch 60 and boost switch 62, master PWM signal 115 must be split into two control ranges, one range for each switch. In an exemplary embodiment, the master PWM signal 115 range is split equally, i.e. one switch is operated from 0 to 50% duty-cycle on master PWM signal 115 and the second switch is operated from 50% to 100% duty cycle. In the illustrative, non-limiting embodiment, 0 to 50% duty-cycle on master PWM signal 115 is used to control buck switch 60 and 50 to 100% duty-cycle is used to control boost switch 62.

However, in an illustrative embodiment, buck switch 60 and boost switch 62 will each receive a 0 to 100% PWM signal. In this embodiment, 0-50% on master PWM signal 115 must be converted to a 0 to 100% PWM signal for buck switch 60. Similarly, 50 to 100% on master PWM signal 115 must be converted to a 0 to 100% PWM signal for boost switch 62. To perform this conversion, master PWM controller 110 sends master PWM signal 115 to PWM splitter 120.

Figure 6:
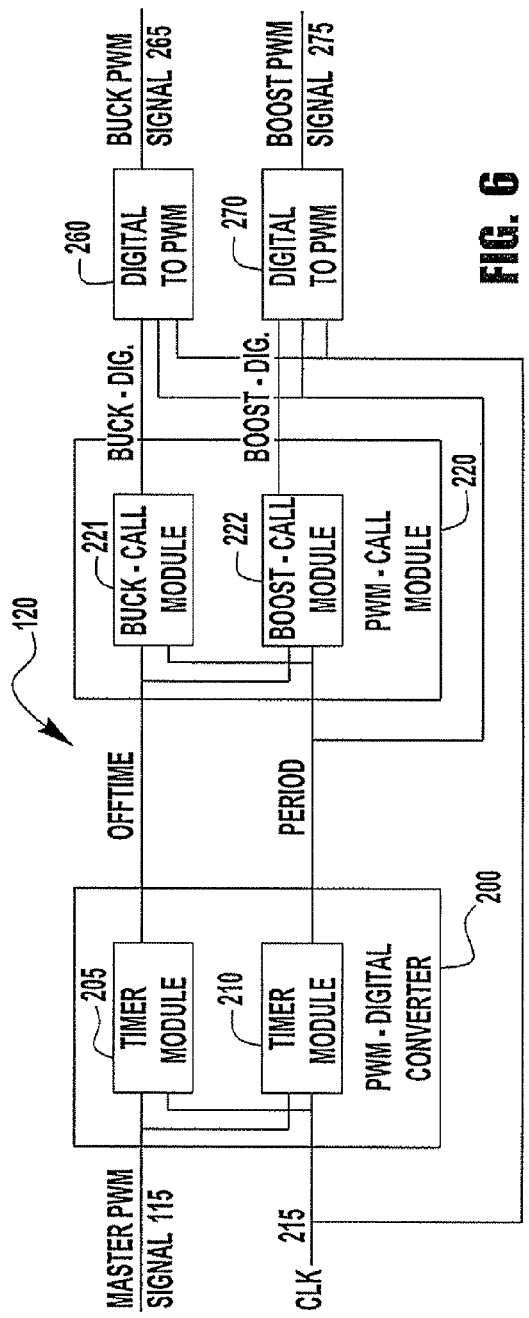
FIG. 6 is a block diagram of the PWM splitter shown in FIG. 3.

As shown in FIG. 6, PWM splitter 120 includes algorithms that splits master PWM signal 115 into buck PWM signal 265 and boost PWM signal 270, which respectively control buck switch 60 and boost switch 62. PWM splitter 120 includes a PWM-digital converter 200, a PWM calculation module 220 and digital-PWM converters 260 and 270.

PWM-digital converter 200 receives master PWM signal 115 and converts it into two digital values. One value (PERIOD) represents the period of PWM signal 115 and the other value (OFFTIME) represents the amount of time the PWM signal is at a value of zero. PWM-digital converter 200 comprises timer modules 205 and 210 to perform the conversion from a PWM signal to a digital value.

Timer module 210 inputs master PWM signal 115 and clock signal 215. Timer module 210 measures the period of master PWM signal 115 by counting the number of pulses from clock signal 215 for one cycle of master PWM signal 115, and the measured value is output as PERIOD. For example, timer module 210 may count the number of pulses from one rising edge of master PWM signal 115 to the next rising edge. The frequency of clock signal 115 is set much greater than that of the PWM signal 115 in order to provide an accurate value for PERIOD.

Similarly, timer module 205 inputs master PWM signal 115 and clock signal 215. However, instead of counting the period, timer module 205 counts clock pulses during the time the PWM signal is at a value of zero for one period of the PWM signal. This digital value is output as OFFTIME. OFFTIME and PERIOD are received by PWM-calc module 220, which generates a digital control value (BUCK-DIG) for buck switch 60 and a digital control value (BOOST-DIG) for the boost switch 62. These digital control values are converted to buck PWM signal 265 and boost PWM signal 275 by digital-PWM modules 260 and 270, respectively.

Figure 7:
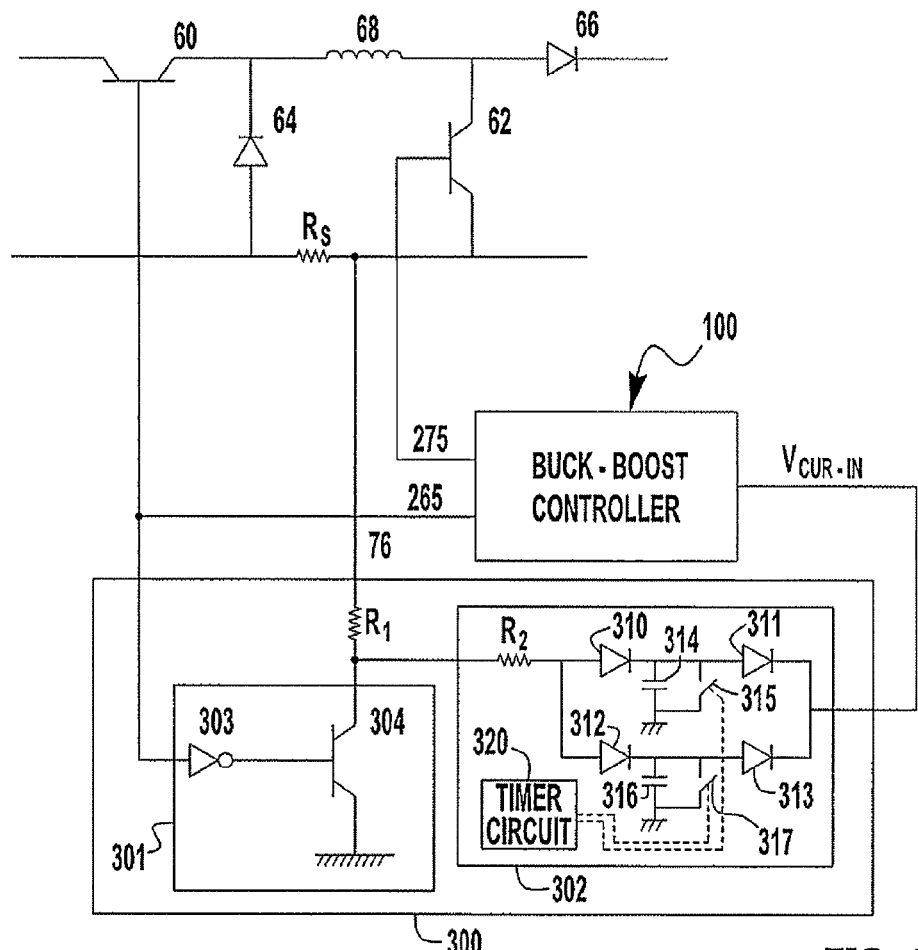
FIG. 7 is a block diagram of the input current synthesizer shown in FIG. 1.

As shown in FIG. 7, input current generator 300 outputs voltage signal Vcur-in, which is a synthesized and integrated signal that represents the average input current to the power supply. In an illustrative, non-limiting embodiment, input current generator 300 comprises input current synthesizer 301 and current integrating circuit 302. Input current synthesizer 301 comprises selector switch 304 and inverter 303. When selector switch 304 is OFF (open), inductor current signal 76, which is sensed at resistor Rs, is sent to current integrating circuit 302 via resistor R1. When selector switch 304 is ON (closed), selector switch 304 connects R1 to ground and a "zero" signal is sent to current integrating circuit 302. Current integrating circuit 302 then averages the signal at its input, i.e. either inductor current signal 76 or the zero signal, and outputs voltage signal Vcur-in.

In an illustrative, non-limiting embodiment, the current integrating circuit 302 includes resistor R2, a diode bridge comprising input diodes 310 and 312 and output diodes 311 and 313, capacitors 314 and 316, discharge switches 315 and 317 and timer circuit 320. Timer circuit 320 operates discharge switches 315 and 317 to control the charging (integrating) cycle of capacitors 314 and 316. Specifically, the discharge switches 315 and 317 are controlled by timer circuit 320 such that capacitors 314 and 316 alternatively integrate any current passing through resistor R2 for each cycle of the PWM signal controlling either boost switch 62 or buck switch 60. Timer circuit 320 operates at the same frequency as buck-boost controller 100. Because capacitors 314 and 316 integrate over the entire PWM cycle, the voltage on the capacitor at the end of the cycle represents the average value of the input current during that particular cycle.

Figure 8:
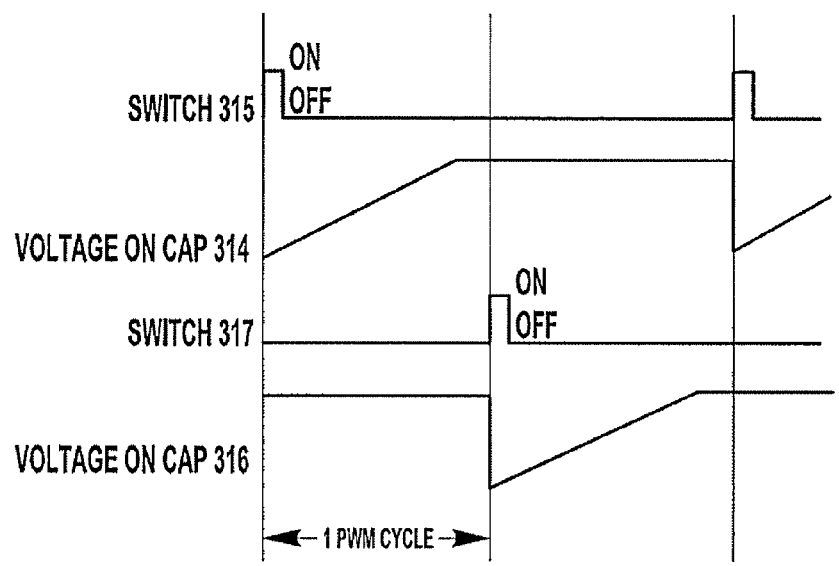
FIG. 8 is a timing diagram for the switches in the integrating circuit of FIG. 7.

As shown in FIG. 8, either switch 315 or 317 is momentarily turned on by timer circuit 320 to discharge the appropriate capacitor at the start of the respective integration cycle. After discharging, the discharged capacitor is at zero volts and any current through resistor R2 will charge the discharged capacitor since it is at a lower voltage than the other capacitor. Input diodes 310 and 312 will ensure that, while one capacitor is integrating (charging), the charge on the other capacitor is "held" constant (so long as the voltage on the charging capacitor is below that of the "held" capacitor). Output diodes 311 and 313 ensure that Vcur-in is the higher of the two capacitor voltages.

When pre-regulator 20 is regulating in boost mode with buck switch 60 ON (closed), inductor current signal 76 is the same as the input current to the power supply and Vcur-in will represent the average input current to the power supply. However, when pre-regulator 20 is regulating in buck mode, the buck switch 60 may be OFF (open) based on the output of buck-boost controller 100. When the buck switch 60 is open, the input current to the power supply will be zero, and the inductor current will not be representative of the input current. Therefore, input current generator 300 must be configured to disregard inductor current signal 76 when buck switch 60 is open.

To accomplish this, the input current generator 300 controls selector switch 304 using buck PWN signal 265. When buck switch 60 is turned ON (closed) by buck PWM signal 265, the inverse signal is sent to selector switch 304 via inverter 302, and selector switch 304 is turned OFF (open). This operation sends the inductor current signal 76 to the current integrating circuit 302 for processing.

Similarly, when buck switch 60 is turned OFF (open) by buck PWM signal 265, selector switch 304 is turned ON (closed) by the inverse signal from inverter 303. This operation routes inductor current signal 76 to ground, and current integrating circuit 302 receives and processes a "zero" input signal. Therefore, by only averaging the inductor current 76 when buck switch 60 is on, Vcur-in will accurately represent the average input current to the power supply during all modes of operation.

Because an average value for the input current is synthesized, only one control loop is needed for stable operation of the buck-boost circuit. This eliminates the need for a second control loop, which simplifies the control circuit and reduces its expense. In addition, because the inductor current is used in synthesizing and integrating the average input current signal, an expensive Hall-effect transducer is not needed, which further reduces the expense of the control circuit.

Figure 9:
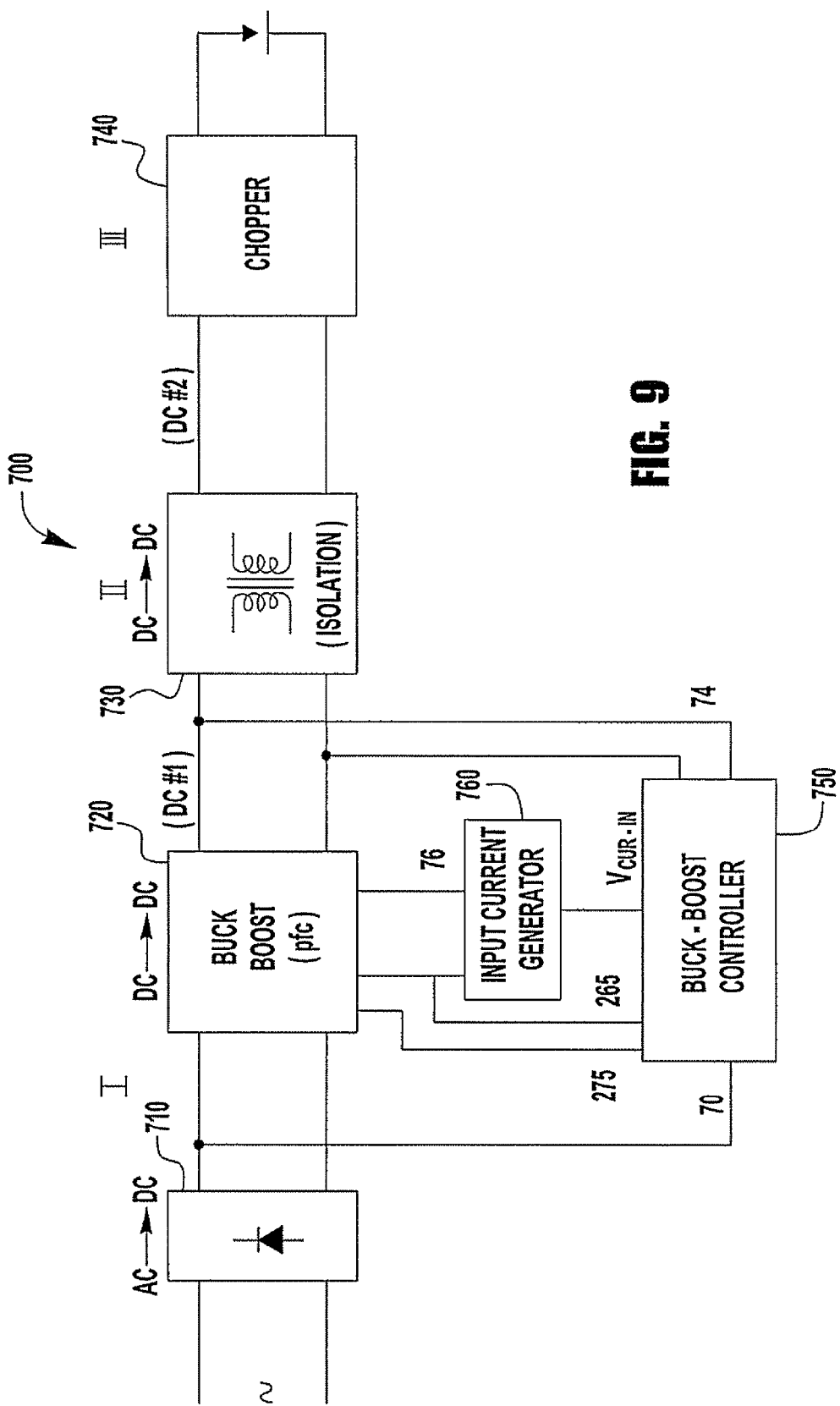
FIG. 9 illustrates a three-stage power supply using a buck-boost controller and input current generator that are consistent with the present invention.

The above exemplary embodiment is discussed using a two-stage power supply topology. However, consistent with the present invention, other power supply topologies may also be used. For example, FIG. 9 shows a power supply 700 configured as a three-stage power supply. Stage I of power supply comprises a rectifier 710 and a pre-regulator 720, which is a buck-boost type DC-DC converter. Pre-regulator 720 may optionally perform power factor correction. Stage II of power supply 700 is an isolated DC-DC converter 730 that converts the voltage on bus DC #1 to a voltage appropriate for Stage III (DC #2). The DC-DC converter 730 typically comprises an inverter, high-frequency transformer and rectifier circuit to perform the voltage conversion. Stage III may be a chopper circuit (chopper 740) that provides the appropriate waveforms used in welding. In FIG. 9, DC-DC converter 720 is controlled by buck-boost controller 750 that uses input current generator 760. The respective configurations of buck-boost controller 750 and input current generator 760 are consistent with the present invention as discussed above.

While the invention has been described in terms of various specific embodiments, those skilled in the art will recognize that the invention can be practiced with modification within the spirit and scope of the claims.

What is claimed is:

1. An input current generator for a buck-boost circuit, comprising:
    a current sensor outputting an inductor current signal representing an inductor current of the buck-boost circuit;
    an input current synthesizer receiving the inductor current signal and outputting a selected signal representing the inductor current signal or a zero signal based on an operating mode of the buck-boost circuit;
    a current averaging circuit integrating the selected signal and outputting an integrated current signal representing an average of an input current to the buck-boost circuit; and
    a buck-boost controller receiving the integrated current signal for outputting a pulse-width-modulated signal for controlling the buck-boost circuit, said buck-boost controller including:
        a PWM controller providing a master pulse-width-modulated signal;
        a clock providing a clock signal; and
        a PWM splitter to receive the master pulse-width-modulated signal and the clock signal to provide a first pulse-width-modulated signal to control a first switch and a second pulse-width-modulated signal to control a second switch, the PWM splitter including:
            a PWM-to-digital converter to provide a first digital signal and a second digital signal, the first digital signal represents a period of the master pulse-width-modulated signal and the second digital signal represents an amount of time at which the master pulse-width-modulated signal is at a value of zero;
            a control module to receive the first and second digital signals to provide a digital buck control signal and a digital boost control signal,
            a first digital-to-PWM module to receive the digital buck control signal, the first and second digital signals to provide the first pulse-width-modulated signal; and
            a second digital-to-PWM module to receive the digital boost control signal, the first and second digital signals to provide the second pulse-width-modulated signal.

2. The input current generator of claim 1, wherein the current averaging circuit comprises a first integrating circuit including,
    a first input diode receiving the selected current signal,
    a first capacitor integrating the selected signal over a predetermined period,
    a first discharge switch to discharge a charge on the capacitor, and
    a first output diode receiving a voltage on the first capacitor.

3. The input current generator of claim 2, wherein the current averaging circuit comprises a second integrating circuit including,
    a second input diode receiving the selected signal,
    a second capacitor integrating the selected current signal over the predetermined period,
    a second discharge switch to discharge a charge on the capacitor, and
    a second output diode receiving a voltage on the second capacitor, and
    wherein the first integrating circuit holds the charge on the first capacitor as the second capacitor integrates the selected signal, and the second integrating circuit holds the charge on the second capacitor as the first capacitor integrates the selected signal.

4. The input current generator of claim 1, wherein the operating mode of the buck-boost circuit is an operating state of a buck switch, and
    wherein the input current synthesizer comprises a selector switch that outputs the inductor current signal when the buck switch is closed and the zero signal when the buck switch is open.

5. A power supply, comprising:
    an input rectifier converting an ac input signal to a rectified dc signal;
    a pre-regulator converting the rectified dc signal to a dc bus signal having a voltage magnitude based on a predetermined setpoint, the pre-regulator comprising a buck-boost circuit;
    an output circuit that converts the dc bus signal to an output signal;
    a control circuit controlling the pre-regulator, the control circuit comprising a buck-boost controller and an input current generator, said buck-boost controller including:

a PWM controller providing a PWM signal indicative of a difference between the predetermined setpoint and the dc bus signal;

a clock providing a clock signal; and a PWM splitter to receive the master pulse-width-modulated signal and the clock signal to provide a first pulse-width-modulated signal to control a first switch and a second pulse-width-modulated signal to control a second switch, the PWM splitter including:

a PWM-to-digital converter to provide a first digital signal and a second digital signal, the first digital signal represents a period of the master pulse-width-modulated signal and the second digital signal represents an amount of time at which the master pulse-width-modulated signal is at a value of zero;

a control module to receive the first and second signals to provide a digital buck control signal and a digital boost control signal, a first digital-to-PWM module to receive the digital buck control signal, the first and second digital signals to provide the first pulse-width-modulated signal; and a second digital-to-PWM module to receive the digital boost control signal, the first and second digital signals to provide the second pulse-width-modulated signal, wherein said input current generator comprises, a current sensor outputting an inductor current signal representing an inductor current of the buck-boost circuit, an input current synthesizer receiving the inductor current signal and outputting a selected signal representing the inductor current signal or a zero signal based on an operating mode of the buck-boost circuit, and a current averaging circuit integrating the selected signal and outputting an integrated current signal representing an average of an input current to the buck-boost circuit, the PWM controller receiving the integrated current signal for generating the PWM signal.

6. The power supply of claim 5, wherein the current averaging circuit comprises a first integrating circuit including, a first input diode receiving the selected current signal, a first capacitor integrating the selected signal over a predetermined period, a first discharge switch to discharge a charge on the capacitor, and a first output diode receiving a voltage on the first capacitor.

7. The power supply of claim 6, wherein the current averaging circuit comprises a second integrating circuit including, a second input diode receiving the selected signal, a second capacitor integrating the selected current signal over the predetermined period, a second discharge switch to discharge a charge on the second capacitor, and a second output diode receiving a voltage on the capacitor, and wherein the first integrating circuit holds the charge on the first capacitor as the second capacitor integrates the selected signal, and the second integrating circuit holds the charge on the second capacitor as the first capacitor integrates the selected signal.

8. The power supply of claim 5, wherein the operating mode of the buck-boost circuit is an operating state of a buck switch in the buck-boost circuit, and wherein the input current synthesizer comprises a selector switch that outputs the inductor current signal when the buck switch is closed and the zero signal when the buck switch is open.

9. The input current generator of claim 1, wherein the PWM controller includes a current amplifier for receiving the integrated current signal for comparison to an error signal representing the difference between a dc bus voltage of the buck-boost circuit and a reference voltage.

10. The input current generator of claim 5, wherein the PWM controller includes a current amplifier for receiving the integrated current signal for comparison to an error signal representing the difference between the predetermined setpoint and the dc bus signal.

* * * * *